(12) United States Patent
Rahman

(10) Patent No.: US 11,582,667 B2
(45) Date of Patent: Feb. 14, 2023

(54) METHODS, SYSTEMS, AND DEVICES FOR FEDERATED BLOCKCHAIN-ENABLED HANDOVER AUTHENTICATION

(71) Applicant: AT&T Intellectual Property I, L.P., Atlanta, GA (US)

(72) Inventor: Moshiur Rahman, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 85 days.

(21) Appl. No.: 16/952,201

(22) Filed: Nov. 19, 2020

(65) Prior Publication Data

US 2022/0159535 A1 May 19, 2022

(51) Int. Cl.
| | |
|---|---|
| *H04W 36/14* | (2009.01) |
| *H04W 36/00* | (2009.01) |
| *H04L 9/06* | (2006.01) |
| *H04W 12/06* | (2021.01) |
| *H04L 9/00* | (2022.01) |

(52) U.S. Cl.
CPC ........... *H04W 36/14* (2013.01); *H04L 9/0643* (2013.01); *H04W 12/06* (2013.01); *H04W 36/0066* (2013.01); *H04L 9/50* (2022.05)

(58) Field of Classification Search
CPC . H04W 36/14; H04W 12/06; H04W 36/0066; H04W 36/0005; H04L 9/0643; H04L 2209/38; H04L 9/32; G06F 21/30; G06Q 20/40
USPC ....................................................... 370/331
See application file for complete search history.

(56) References Cited

U.S. PATENT DOCUMENTS

| | | | |
|---|---|---|---|
| 10,194,320 B1* | 1/2019 | Egner | ................... H04L 9/0819 |
| 10,299,128 B1* | 5/2019 | Suthar | ..................... H04W 8/02 |
| 2012/0278430 A1* | 11/2012 | Lehane | ............... H04L 41/5054 |
| | | | 709/217 |

* cited by examiner

*Primary Examiner* — Peter G Solinsky
(74) *Attorney, Agent, or Firm* — Guntin & Gust, PLC; Kenneth Kwan

(57) ABSTRACT

Aspects of the subject disclosure may include, for example, authenticating, by a federated blockchain controller, a user equipment located within a cell coverage area of a network that includes heterogeneous cells. The federated blockchain controller can provide encryption data to the user equipment and corresponding authentication information to one or more multi-access edge computing (MEC) devices associated with the heterogeneous cells to enable secure and efficient handovers for the user equipment amongst the heterogeneous cells, without a need for additional handover reauthentication procedures. Other embodiments are disclosed.

20 Claims, 10 Drawing Sheets

METHODS, SYSTEMS, AND DEVICES FOR FEDERATED BLOCKCHAIN-ENABLED HANDOVER AUTHENTICATION

FIELD OF THE DISCLOSURE

The subject disclosure relates to federated blockchain-enabled handover authentications.

BACKGROUND

Some networks operate through heterogeneous cells and expand overlay coverage. For example, a 5G network can include one or more terrestrial cells (including macrocell(s), small cell(s) or microcell(s), Wi-Fi-based cell(s), or the like) and/or one or more non-terrestrial cells (including flying cell(s), or drone cell(s), served by unmanned aerial vehicles (UAVs), satellites, or the like). In these networks, many devices, such as mobile devices, Internet-of-Things (IoT) devices, vehicles, etc., can be connected to the network and may be traveling amongst the various cells. When a device travels within a cell that has multiple network nodes (e.g., access points), or moves from one cell to another, a handoff (or handover) generally occurs, where an access point to which the device is currently connected facilitates a connection between the device and another (target) access point, such that the device can maintain access to the network. Each handover involves an authentication process, where a target access point authenticates (or reauthenticates) the device before establishing a connection with the device. In cases where a large quantity of devices is traveling amongst the cells (e.g., in densely populated areas), the number of repeated handovers can become significant. This results in numerous reauthentication procedures, which can negatively impact network performance. Moreover, following frequent handovers, reauthentication mechanisms can become more involved, which may lead to further network delays and decreased network reliability.

BRIEF DESCRIPTION OF THE DRAWINGS

Reference will now be made to the accompanying drawings, which are not necessarily drawn to scale, and wherein.

DETAILED DESCRIPTION

Figure 1:
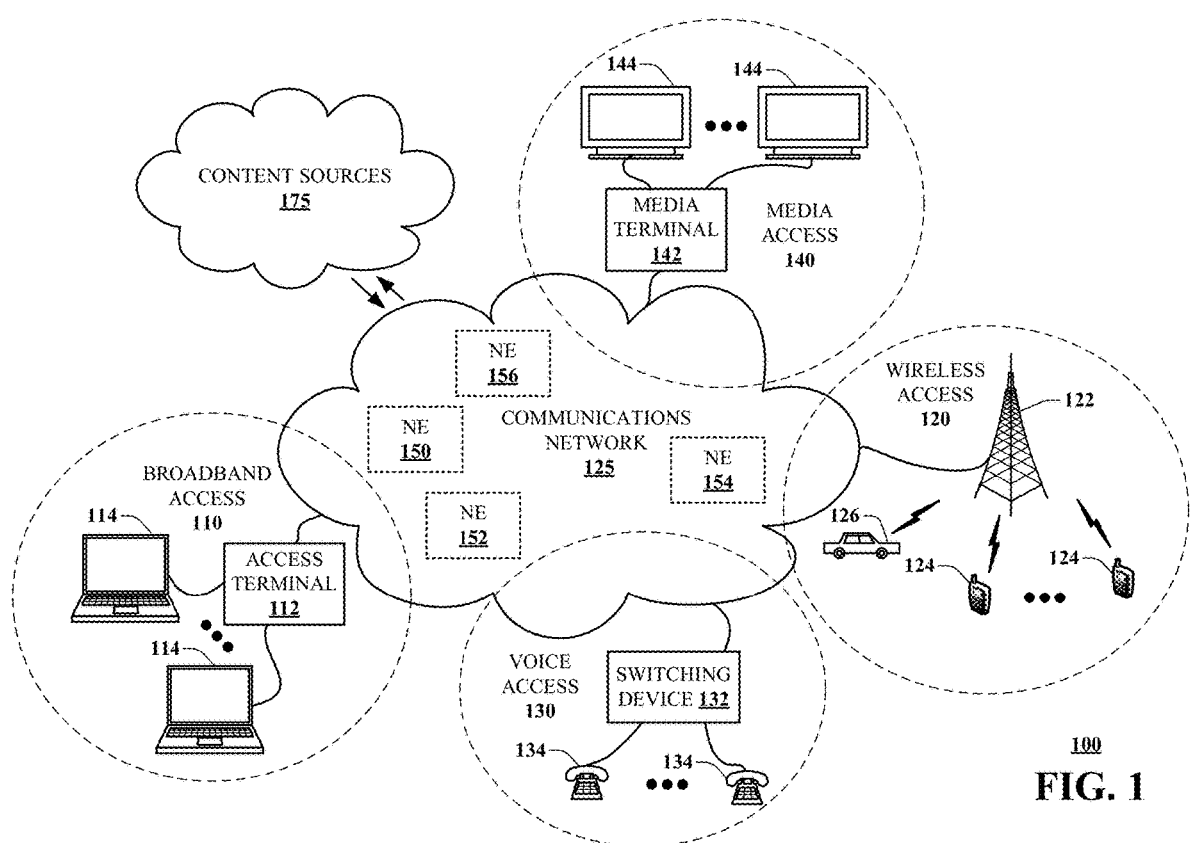
FIG. 1 is a block diagram illustrating an exemplary, non-limiting embodiment of a communications network in accordance with various aspects described herein.

The subject disclosure describes, among other things, illustrative embodiments for a blockchain-enabled handover authentication system that is capable of eliminating a need to reauthenticate user equipment in repeated handovers. In exemplary embodiments, the authentication system can leverage a federated blockchain implementation (e.g., configured as a blockchain center or controller) and the processing capabilities of multi-access edge computing (MEC) to provide a shared, intelligent solution for facilitating efficient and secure handovers. In various embodiments, a network can include heterogeneous cells that provide varying types of radio access networks (RANs). A given cell can include one or more access points (e.g., base stations or the like) that are augmented by cloud computing capabilities via a MEC device. In some embodiments, the federated blockchain implementation is capable of authenticating a user equipment as part of an initial registration process, and providing encryption data (e.g., keys) to the user equipment as well as corresponding authentication information to MEC device(s). A MEC device in a given cell can, based on the authentication information, provide validation message(s) to some or all of the access points in the cell that enable each access point to establish a connection with the user equipment in the event of a handover, without needing to undergo a reauthentication process. Other embodiments are described in the subject disclosure.

Employing the authentication system (e.g., in heterogeneous networks), as described herein, enables efficient handovers with reduced network response delays, which might otherwise occur in cases where access points are constantly undergoing reauthentication procedures Eliminating reauthentication in repeated handovers reduces the quantity of device-related network processing operations that needs to be performed, which conserves network resources and power resources, thereby reducing the probability of network service interruption (e.g., voice call drops or the like). This improves network reliability, end-to-end quality of service (QoS), and overall user experience.

Additionally, incorporating a federated blockchain implementation into the authentication system enables secure communications between devices and the network, which improves overall network security and enhances user privacy. Leveraging a federated blockchain network for key or authentication management (e.g., where a user equipment is authenticated and provided with encryption data, and where MEC device(s) receive corresponding authentication information that enable the MEC device(s) to facilitate handovers for the user equipment) also provides a scalable and lightweight authentication flow mechanism that reduces or eliminates a need for intermediaries to perform authentication operations, as federated blockchain network mining (e.g., communication verifications) can supplant traditional key transportation handshaking, which also reduces costs. Furthermore, integrating blockchain functionality with a MEC architecture at an edge of a network (e.g., proximate to or within heterogeneous cells) enables more efficient real-time data collection, analysis, and processing near the data collection sources, which reduces or eliminates signaling overhead and conserves energy, thereby providing a dynamic, robust, and architecturally evolvable network.

One or more aspects of the subject disclosure include a device, comprising a processing system including a processor, and a memory that stores executable instructions that, when executed by the processing system, facilitate performance of operations. The operations can include obtaining data relating to a user equipment, where the user equipment is communicatively coupled to a first access point of a plurality of access points, and where the plurality of access points is associated with a first cell of a plurality of heterogeneous cells of a network. Further, the operations can include receiving, from a blockchain controller, an authentication information vector, where the authentication information vector is associated with a block of data of a blockchain stored in the blockchain controller. Furthermore, the operations can include determining that the authentication information vector corresponds to the user equipment based on the data relating to the user equipment, generating a validation message responsive to determining that the authentication information vector corresponds to the user equipment, and transmitting the validation message to a second access point of the plurality of access points, where the validation message enables the second access point to proceed with a handover for the user equipment without undergoing a handover authentication procedure.

One or more aspects of the subject disclosure include a machine-readable storage device, comprising executable instructions that, when executed by a processing system including a processor, facilitate performance of operations. The operations can include providing, to a blockchain controller, data relating to a user equipment to authenticate the user equipment, where the user equipment is communicatively coupled to a network via a first access point, and where the first access point is associated with a first cell of a plurality of heterogeneous cells of the network. Further, the operations can include obtaining, from the blockchain controller, encryption data, where the encryption data is associated with a block of data of a blockchain accessible to the blockchain controller, where the encryption data facilitates creation of an authentication information vector to be provided to a multi-access edge computing (MEC) device that corresponds to a second access point associated with a second cell of the plurality of heterogeneous cells of the network, and where the authentication information vector enables the MEC device to provide, to the second access point, a validation message relating to the user equipment. Furthermore, the operations can include communicating with the second access point to effect a handover for the user equipment from the first cell to the second cell, where the validation message enables the second access point to proceed with the handover for the user equipment without undergoing a handover authentication procedure.

One or more aspects of the subject disclosure include a method. The method can include obtaining, by a processing system including a processor, data relating to a user equipment, where the data includes information identifying the user equipment, and where the user equipment is communicatively coupled to a first access point associated with a first cell of a plurality of heterogeneous cells of a network. The method can further include authenticating, by the processing system, the user equipment according to the data relating to the user equipment, where the authenticating the user equipment includes verifying the information identifying the user equipment and updating a blockchain with a block of data according to the verifying the information identifying the user equipment. The method can further include providing, by the processing system, encryption data to the user equipment responsive to the authenticating the user equipment, transmitting, by the processing system, an authentication information vector to a first multi-access edge computing (MEC) device, where the authentication information vector corresponds to the encryption data and enables the first MEC device to cause a second access point associated with the first cell to perform handovers for the user equipment without a need for the second access point to undergo a handover authentication procedure.

Referring now to FIG. 1, a block diagram is shown illustrating an example, non-limiting embodiment of a communications network or system 100 in accordance with various aspects described herein. For example, the communications system 100 can facilitate in whole or in part providing federated blockchain-based handover authentications.

The communications network 125 provides broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
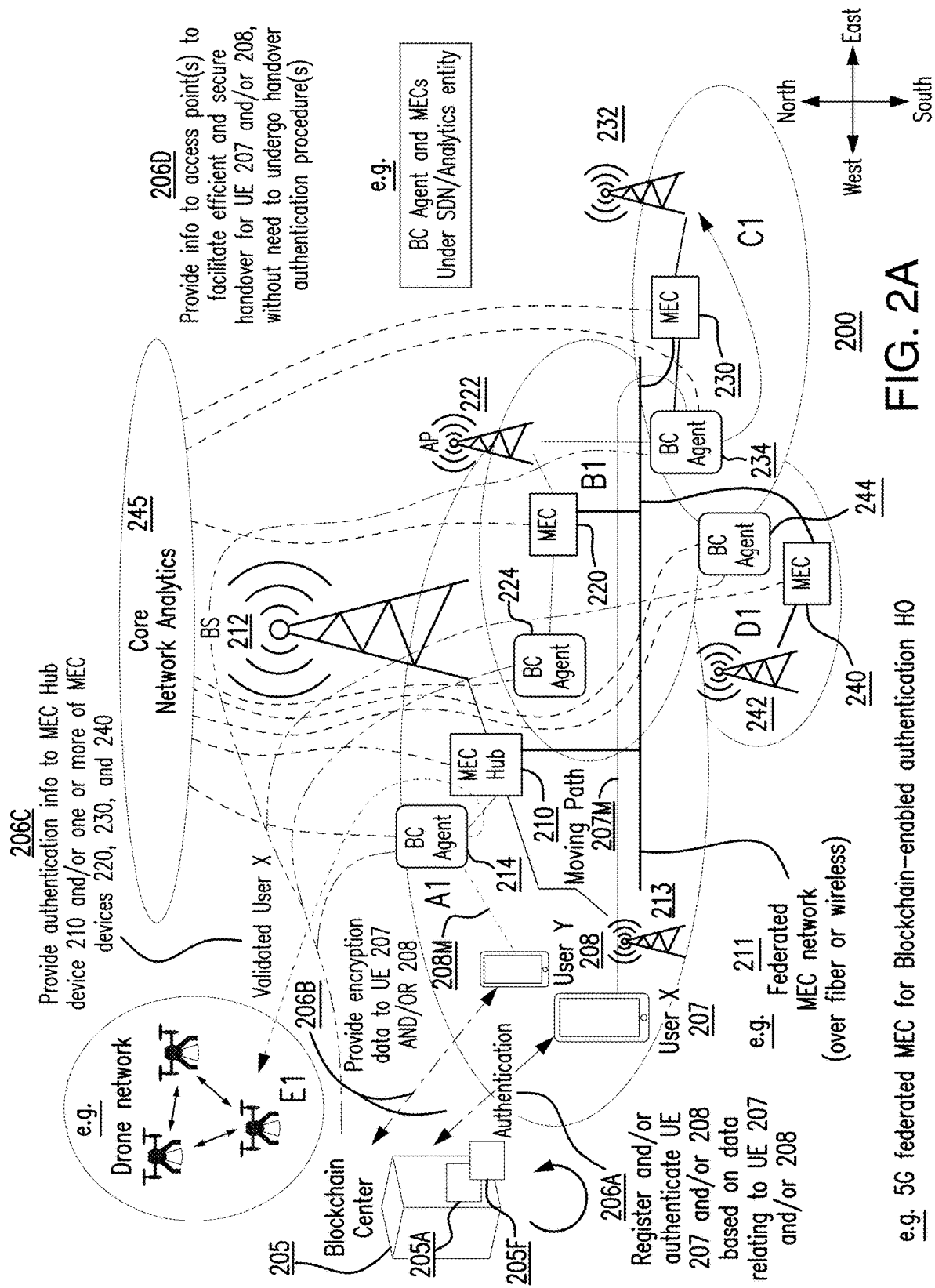
FIG. 2A is a block diagram illustrating an example, non-limiting embodiment of a system functioning within or in conjunction with the communication network of FIG. 1 in accordance with various aspects described herein.

FIG. 2A is a block diagram illustrating an example, non-limiting embodiment of a network system 200 that leverages a federated blockchain network and network edge computing capabilities to provide secure and efficient handover authentications for user equipment. The network system 200 can function in, or in conjunction with, various communication systems and networks including the communications system 100 of FIG. 1 in accordance with various aspects described herein.

As shown in FIG. 2A, the network system 200 can include cells A1, B1, C1, D1, and E1. In various embodiments, the cells A1-E1 can be heterogeneous cells that provide access to the network system 200 using different types of radio access technologies. In some embodiments, cells A1-D1 can be terrestrial cells (e.g., one or more macrocells, small cells or microcells, Wi-Fi-based cell(s), or the like) and cell E1 can be a non-terrestrial cell (e.g., a flying cell, or drone cell, served by UAVs and/or the like). In various embodiments, the network system 200 can include various heterogeneous cell configurations with various quantities of cells and/or various types of cells.

User equipment, such as the user equipment 207 and 208, can be located within a cell coverage area of the network system 200, provided by cells A1-E1, and may travel amongst various ones of the cells A1-E1 (e.g., as shown by reference numbers 207M and 208M). The user equipment 207 and 208 can each include one or more data terminals 114, one or more mobile devices 124, one or more vehicles 126, one or more display devices 144, or one or more other client devices.

Each of the cells A1-D1 can include, or be associated with, one or more access points (e.g., base stations or the like) that each provides a radio access technology capable of facilitating communications between the user equipment 207 and/or 208 and a core network 245 of the network system 200. Each of the cells A1-D1 can also be associated with a MEC device. As the name/nomenclature implies, a MEC device may be located at, or proximate to, an edge of the network system 200, which may be useful in reducing (e.g., minimizing) delays associated with provisioning of data or services to one or more (requesting) devices.

As shown in FIG. 2A, the cell A1 can include a MEC Hub device 210 and access points 212 and 213, the cell B1 can include a MEC device 220 and an access point 222, and the cell C1 can include a MEC device 230 and an access point 232. As further shown in FIG. 2A, the cell D1 can include a MEC device 240 and an access point 242 and the cell E1 can include one or more UAVs that provide extended access to the network system 200. In various embodiments, each of the MEC Hub device 210 and the MEC devices 220, 230, and 240 can function as a controller in the respective heterogeneous cell. In some embodiments, one or more of the MEC Hub device 210 and the MEC devices 220, 230, and 240 can additionally function as a controller for non-terrestrial cells. For example, the MEC Hub device 210 can be configured to at least partially control the UAVs in the cell E1. Continuing with the example, in a case where the UAVs are redirected to a different geographical area, such as to the east of the cell D1, the MEC device 240 can be configured to at least partially control the UAVs.

As shown in FIG. 2A, the MEC Hub device 210 and the MEC devices 220, 230, and 240 can be communicatively coupled to one another via an interface 211. The interface 211 can be a wired and/or a wireless interface. In some embodiments, the interface 211 can include fiber cable(s), hybrid fiber-coaxial (HFC) cable(s), or the like. In some embodiments, the MEC Hub device 210 can function as a centralized MEC node for the various cells A1-E1. For example, in a network disaster recovery situation, the MEC Hub device 210 can function as a master MEC in the multiple-cell infrastructure and coordinate operations of the MEC devices 220, 230, and/or 240.

In various embodiments, each of the MEC Hub device 210 and the MEC devices 220, 230, and 240 can store data relating to user equipment, such as the user equipment 207 and 208, in a data structure (e.g., a database, an array, a linked list, a table, a trie, and/or the like). In various embodiments, some (e.g., one or more) of the MEC Hub device 210 and the MEC devices 220, 230, and 240 can store the data, and others of the MEC Hub device 210 and the MEC devices 220, 230, and 240 can access the stored data therefrom (e.g., via the interface 211). In some embodiments, a MEC device can receive the data from an associated access point (e.g., one or more of access points 212, 213, 222, 232, and 242) and/or from one or more of the other MEC devices (e.g., via the interface 211). The data relating to a user equipment can include, for example, information regarding an identity of the user equipment, a current location of the user equipment, current signal strength(s) of nearby access points as measured by the user equipment, a direction of movement of the user equipment, a speed of travel of the user equipment, physical layer properties of the user equipment, signal round trip times (RTT), authentication information (e.g., public and/or private key assignment(s) that might be provided by a blockchain controller, such as the blockchain controller 205 described in more detail below), information relating to facilitating handovers (e.g., handover criteria, conditions, and/or processes, historical information regarding prior handovers, or the like), etc. In various embodiments, the MEC Hub device 210 and the MEC devices 220, 230, and 240 can dynamically update entries in the data structure in real-time, or near real-time, as updated data relating to user equipment is received.

In various embodiments, each of the MEC Hub device 210 and the MEC devices 220, 230, and 240 can manage an inventory of associated access points, such as access points 212, 213, 222, 232, and 242, and can store data relating to such access points in a data structure (e.g., a database, an array, a linked list, a table, a trie, and/or the like). The data relating to an access point can include, for example, information regarding an identity of the access point (e.g., a physical cell identifier (PCI) or the like), a location of the access point, actual or estimated available bandwidth of the access point, throughput of the access point, etc. In various embodiments, the MEC Hub device 210 and the MEC devices 220, 230, and 240 can dynamically update entries in the data structure in real-time, or near real-time, as updated data relating to the associated access points is received.

As shown in FIG. 2A, the network system 200 can include a blockchain center (or controller) 205. The blockchain controller 205 can be communicatively coupled to each of the MEC Hub device 210 and the MEC devices 220, 230, and 240. As shown in FIG. 2A, the network system 200 can include blockchain agents (BC agents) 214, 224, 234, and 244, respectively associated with the MEC Hub device 210 and the MEC devices 220, 230, and 240. In various embodiments, the blockchain controller 205 can exchange communications with the MEC Hub device 210 and the MEC devices 220, 230, and 240 via the respective BC agents 214, 224, 234, and 244. In some embodiments, the blockchain controller 205 may communicate with only one of the MEC Hub device 210 and the MEC devices 220, 230, and 240, such as with only the MEC Hub device 210 via BC agent 214. In such a case, for example, the MEC Hub device 210, can exchange communications between the blockchain controller 205 and each of the MEC devices 220, 230, and 240 via the interface 211. Communications can include, for example, authentication information vector(s), provided by the blockchain controller 205, that the MEC devices 220, 230, and/or 240 can utilize to facilitate respective access points 222, 232, and/or 242 in effecting (or otherwise direct such access point(s) to effect) handovers for user equipment, such as the user equipment 207 and/or 208, without a need to undergo reauthentication procedures for the user equipment (e.g., as described in more detail below).

In some embodiments, the BC agents 214, 224, 234, and 244 can each be implemented in software and/or firmware located in a device that is separate from the respective one of the MEC Hub device 210 and the MEC devices 220, 230, and 240. Additionally, or alternatively, the BC agents 214, 224, 234, and 244 can each be implemented in software and/or firmware located in the respective one of the MEC Hub device 210 and the MEC devices 220, 230, and 240.

Although the blockchain controller 205 is shown in FIG. 2A as a single device, it is to be understood and appreciated that the blockchain controller 205 can include, or span, multiple network devices or nodes. In various embodiments, the blockchain controller 205 can be implemented as a federated blockchain network. The federated blockchain network can regulate user access so as to prevent users from exhausting the computational resources of the federated blockchain network. In some embodiments, the federated blockchain network can include resources that span public blockchain nodes, private cloud service provider (CSP) nodes, and/or the like, which can secure the federated blockchain network from public cyberattacks. In some embodiments, the federated blockchain network can include resources that span more than one trusted CSP, and thus have a more decentralized architecture than a conventional private blockchain network (that is typically constrained to one CSP), which makes the federated blockchain network more reliable and further secures the federated blockchain network from attack.

In various embodiments, the blockchain controller 205 can be configured to perform user equipment registration or authentication, and provide corresponding authentication information to one or more of the MEC Hub device 210 and the MEC devices 220, 230, and 240 to facilitate secure and efficient handovers amongst the cells A1-E1, without the need for repeated reauthentications. For example, upon registering or authenticating the user equipment 207, and providing corresponding authentication information to one or more of the MEC Hub device 210 and the MEC devices 220, 230, and 240, such MEC device(s) can facilitate, or otherwise cause, respective access points (e.g., access points 212, 213, 222, 232, and/or 242) to effect handovers for the user equipment 230 from one cell to another cell and so on, without the access point(s), or associated device(s), having to perform any reauthentications of the user equipment 207. In some embodiments, the blockchain controller 205 can, via one or more nodes of the federated blockchain network, receive data relating to user equipment, such as the user equipment 207 and/or 208. The data relating to the user equipment can include, for example, information regarding an identity of the user equipment, a current location of the user equipment, current signal strength(s) of nearby access points as measured by the user equipment, a direction of movement of the user equipment, a speed of travel of the user equipment, physical layer properties of the user equipment, signal RTT, other real-time, or near real-time, measurement data, etc.

In some embodiments, the blockchain controller 205 can receive the data relating to a user equipment, such as the user equipment 207 and/or 208, directly from the user equipment (e.g., via an interface, such as a wireless interface). In some embodiments, in a case where there does not exist a direct connection channel between a user equipment and the blockchain controller 205, for example, a MEC device (e.g., MEC Hub device 210 or one of MEC devices 220, 230, and 240) can receive the data relating to the user equipment (e.g., as described above), and provide the data to the blockchain controller 205.

As shown by reference number 206A, the blockchain controller 205 can process the data to register, or otherwise authenticate, the user equipment. In various embodiments, multiple nodes of the blockchain controller 205 can process the data, which may include, for example, accessing one or more server devices of the network system 200, such as authentication server device(s), to verify the identity of the user equipment. In some embodiments, the blockchain controller 205 can update a blockchain with a transaction or block of data based on the processing (e.g., which may include validity verifications). In various embodiments, a majority of the nodes of the federated blockchain network may need to verify the validity of each block of data to be added to the block, which improves the integrity of the blockchain and provides secure user equipment authentication on the network.

As shown by reference number 206B, the blockchain controller 205 can provide encryption data (e.g., including one or more public and/or private key pairs or the like) to the user equipment 207 and/or 208. As shown by reference number 206C, the blockchain controller 205 can provide the MEC Hub device 210 and the MEC devices 220, 230, and 240 with access to authentication information that corresponds to the encryption data and/or that is associated with the block of data in the blockchain to enable the MEC Hub device 210, and the MEC devices 220, 230, and 240 to facilitate secure and efficient handovers. In some embodiments, the blockchain controller 205 can provide the authentication information in the form of an authentication information vector that includes information identifying the user equipment and/or some or all of the public and/or private keys included in the encryption data. In various embodiments, a MEC device, such as the MEC Hub device 210 or one of the MEC devices 220, 230, and 240, can determine whether an authentication information vector corresponds to a particular user equipment, such as the user equipment 207, by matching information identifying the user equipment (e.g., which may be included in the authentication information vector) with identification information included in data relating to the user equipment received from an access point, such as one of access points 212, 213, 222, 232, and 242.

As shown by reference number 206D, one or more of the MEC Hub device 210 and the MEC devices 220, 230, and 240 can provide information regarding the user equipment 207, such as validation message(s) that include public key(s) or the like associated with the user equipment 207, to associated access points (e.g., access points 212, 213, 222, 232, and/or 242), to enable such access points to identify the user equipment 207 in the event of a handover. In this way, the blockchain-enabled handover authentication system can leverage edge computing resources of a network to provide secure and efficient handovers without a need for repeated handover authentications.

As an example, in a case where the user equipment 207 has already registered with the blockchain controller 205, and travels along the path 207M, from the cell A1 toward the cell B1, the MEC device 220 can detect the user equipment 207's approach (e.g., from data relating to the user equipment 207 received from the access point 222 and/or from the MEC Hub device 210), determine a correspondence between identification information for the user equipment 207 and authentication information received from the blockchain controller 205, generate a validation message (e.g., that includes some or all of the public and/or private keys associated with the user equipment 207), and provide the validation message to the access point 222. Continuing with the example, the validation message can enable the access point 222 to identify, and securely establish a communication session with, the user equipment 207, without the access point 222 needing or having to undergo a handover authentication procedure. This reduces or eliminates a need for the access point 222 to perform additional actions that might otherwise be required in a handover authentication (or reauthentication), such as submitting one or more authentication or verification requests to server device(s) of the network system 200, receiving responses to the requests (e.g., validation data or responses), processing the responses, etc. In various embodiments, an access point can nevertheless transmit authentication or verification request(s) to the server device(s) to verify a user equipment, and the access point can perform handover(s) based on any validation response(s) to the request(s) or, alternatively, perform handover(s) regardless of the validation response(s), such as by not using the validation response(s) as part of performing the handover(s).

In some embodiments, a MEC device, such as the MEC Hub device 210 or one of the MEC devices 220, 230, and 240, can facilitate initial registration or authentication of a user equipment, such as the user equipment 207. In some embodiments, the MEC device can facilitate the initial registration or authentication of the user equipment based on determining that the user equipment is moving toward a cell, such as by performing a trajectory analysis of the user equipment to predict a future location of the user equipment according to data relating to the user equipment (e.g., information regarding a current location of the user equipment, information regarding a speed of travel of the user equipment, information regarding a direction of travel of the user equipment, historical location information relating to the user equipment and/or other user equipment, behavior information relating to the user equipment and/or other user equipment, and so on). For example, in a case where the user equipment 207 is currently in an ongoing communication session (e.g., a voice call session, a video call session, and/or a data transfer session, such as a data upload session and/or a data download session) and is moving toward a target cell (thus potentially necessitating a handover), a corresponding MEC device (e.g., the MEC Hub device 210 or one of the MEC devices 220, 230, and 240), associated with the cell in which the user equipment 207 is located (or associated with the target cell), can detect, based on up-to-date, real-time, or near real-time, data relating to the user equipment 207, such movement of the user equipment 207, and coordinate communications between the blockchain controller 205 and the user equipment 207 to facilitate initial registration/authentication as needed. In various embodiments, the corresponding MEC device can determine a need to facilitate initial registration/authentication based on an absence of authentication information for the user equipment 207. In some embodiments, after registration or authentication is complete, a user equipment may not need to further communicate with the blockchain controller 205 (e.g., at least for a duration of the ongoing communication session, or longer). In various embodiments, once a user equipment has been registered or authenticated, no additional reauthentications are needed regardless of a quantity of repeated handovers that might occur during an ongoing communication session.

In some embodiments, the blockchain controller 205 can be configured to require registration, or authentication, of a user equipment prior to initiation (e.g., within a threshold time prior to initiation) of a communication session at a user equipment, such as a voice call session, a video call session, and/or a data transfer session. In such a case, a corresponding MEC device (e.g., MEC Hub device 210 or one of the MEC devices 220, 230, and 240), associated with the cell in which the user equipment is located, can detect that a communication session is to be initiated for the user equipment (e.g., based on data relating to the user equipment or the like), and coordinate communications between the blockchain controller 205 and the user equipment to facilitate registration or authentication as needed.

In various embodiments, registration or authentication of a user equipment by the blockchain controller 205 can remain valid so long as one or more conditions are satisfied. For example, successful registration or authentication of a user equipment can remain valid indefinitely, can remain valid only for a duration of an ongoing communication session, can remain valid for a predefined amount of time, can remain valid so long as the user equipment remains within a cell coverage area of the network system 200, etc. Maintaining such validity can reduce or eliminate a need for access points to undergo handover authentication procedures for the user equipment, for example, until the one or more conditions are no longer satisfied.

As shown in FIG. 2A, the blockchain controller 205 can include an AuthControl module 205A and a secinfo module 205F, which can be configured to perform various actions or operations described above with respect to the blockchain controller 205. In various embodiments, the AuthControl module 205A can be configured to process data relating to a user equipment, such as user equipment 207, to read, identify, or otherwise extract, one or more data items relating to the user equipment, and provide the data items to the secinfo module 205F. The data items can include, for example, information regarding an identity of the user equipment, a current location of the user equipment, current signal strength(s) of nearby access points detected by the user equipment, a direction of movement of the user equipment, a speed of travel of the user equipment, physical layer properties of the user equipment, signal RTT, etc. In various embodiments, the AuthControl module 205A can generate, assign, and/or provide, encryption data (e.g., the encryption data described above), including public and private keys (e.g., one or more pairs of public and private keys or the like), to the user equipment for use with future handovers.

In various embodiments, the secinfo module 205F can process the data items, including the public and private key(s), such as by encrypting the data items and/or packaging the data items into an authentication information vector (e.g., the authentication information vector described above). In various embodiments, the secinfo module 205F can transmit, or otherwise distribute, the authentication information vector to one or more of the MEC Hub device 210 and the MEC devices 220, 230, and 240.

In some embodiments, in a case where a MEC device, such as the MEC Hub device 210 or one of the MEC devices 220, 230, and 240, determines that a user equipment (e.g., user equipment 207) is traveling towards another cell, the MEC device can provide a notification to the blockchain controller 205. The notification can include, for example, information regarding an identity of the user equipment, a speed of travel of the user equipment, a direction of travel of the user equipment, a current position of the user equipment, trajectory analysis information (e.g., as described above), and/or the like. In such a case, the secinfo module 205F can access a data structure (e.g., a database, an array, a linked list, a table, a trie, and/or the like) accessible to the blockchain controller 205 to confirm whether the user equipment has already been authenticated. In a case where the secinfo module 205F determines that the user equipment has not yet been authenticated, the secinfo module 205F can instruct the AuthControl module 205A to attempt to register or authenticate the user equipment, e.g., in a manner similar to that described above.

In some embodiments, the blockchain controller 205 (e.g., the secinfo module 205F) can be configured to similarly determine whether a user equipment, such as the user equipment 207, is traveling towards another cell (e.g., based on a speed of travel of the user equipment, a direction of travel of the user equipment, and/or a current position of the user equipment).

In various embodiments, the blockchain controller 205 can be configured to detect and address potential network attacks or suspicious user equipment behavior. For example, in some embodiments, the blockchain controller 205 can initiate a timer (or timeout) 'T' that is equal, or near equal, to an amount of time until the handover is expected to occur, and include the timer in an authentication information vector to be provided to a corresponding MEC device, such as the MEC Hub device 210 or one of the MEC devices 220, 230, and 240. The MEC device can, in turn, include the timer in a validation message to be provided to the associated access point, such as the access point 212, 213, 222, 232, or 242. The access point can monitor the timer, and in a case where the timer expires and the handover does not occur, the access point can notify the MEC device, which can, in turn, notify the blockchain controller 205. The blockchain controller 205 can, based on the notification, perform verification operation(s) on one or more blocks of data in the blockchain to determine whether there is a potential network compromise or suspicious user equipment behavior. In a case where such verifications fail or the like, for example, the blockchain controller 205 can define access limits (e.g., block the user equipment or the like) and notify some or all of the MEC devices, such as MEC Hub device 210 and MEC devices 220, 230, and 240, to similarly configure access limits at the associated access points.

In some embodiments, the blockchain controller 205 can be configured to determine whether to confirm prior authentication of a user equipment, such as the user equipment 207, based on one or more criteria. The criteria can relate, for example, to a subscription plan associated with the user equipment, a type or priority level of an ongoing communication session at the user equipment, a risk-level of an ongoing communication session at the user equipment, historical activity of the user equipment, and/or the like. For example, the blockchain controller 205 can decide to confirm prior authentication of a user equipment depending on whether an ongoing communication has high priority (e.g., involves a sensitive service or is mission critical, such as an emergency call being conducted by emergency personnel or the like), has low priority (e.g., is for a user equipment associated with low QoS requirements), appears to be risky (e.g., based on data traffic patterns or the like), etc.

In various embodiments, the core network 245 can be, or include, a cloud-based platform, a non-cloud-based platform, a hybrid platform that is partially cloud-based and partially non-cloud-based, and/or the like. In some embodiments, the core network 245 can be configured to provide real-time, central network analytics and/or offline analytics-level data mining functionality for network system 200. In various embodiments, the core network 245 can receive various measurement data (e.g., relating to timing, signal strengths, bandwidth availability, etc.) from some or all of the devices in the various cells A1-E1, and process the measurement data to determine the operating status or condition of individual RANs as well as of the overall network system 200.

In some embodiments, the core network 245, along with the blockchain controller 205, the MEC Hub device 210, the MEC devices 220, 230, and 240, and the BC agents 214, 224, 234, and 244, can be implemented as a software defined network (SDN). In these embodiments, the core network 245 can provide direct control of each of these devices or components. This enables a federated blockchain-enabled MEC authentication implementation that can be further enhanced by network analytics. In various embodiments, the SDN can receive, in real-time or near real-time, data relating to a user equipment, such as identification information for the user equipment 207, information regarding a current location of the user equipment 207, current signal strength(s) of nearby access points detected by the user equipment 207, a direction of movement of the user equipment 207, a speed of travel of the user equipment 207, physical layer properties of the user equipment 207, signal RTT, Internet Protocol (IP) address(es), etc. The SDN can determine a possible future location of the user equipment based on the data, identify a MEC device associated with that location, and configure appropriate flow table(s) for that MEC device to accelerate the overall handover authentication process. By predicting a likely travel route of a user equipment, the SDN controller can securely and efficiently service the user equipment as handovers are needed.

In some embodiments, the core network 245 can generate policies and/or rules for one or more of the blockchain controller 205, the MEC Hub device 210, and the MEC devices 220, 230, and 240 based on network analytics, and apply such policies and/or rules thereto (e.g., in the form of tables stored in these devices or components). The core network 245 can generate various types of policies or rules based on a variety of inputs, such as, for example, a user equipment's associated subscription plan, QoS requirement(s), a current time of day, a current day of week, month, or year, cell bandwidth availability, quantity of devices in a given cell, etc. As an example, in a case where a user equipment, such as the user equipment 207, is to undergo a handover from a current, serving cell to a target cell, but there is congestion in the target cell, an ongoing call session at the user equipment might typically terminate. However, the core network 245 can determine, based on current network analytics, that there are alternative neighboring, terrestrial cell(s) or non-terrestrial cell(s) (e.g., served by satellites and/or UAVs) that can service the user equipment, and facilitate an alternative handover based on this determination. In such a case, the core network 245 can provide a policy or rule to the MEC device of the current cell and/or the MEC device of an alternative target cell to facilitate the handover.

It is to be understood and appreciated that the quantity and arrangement of controllers, modules, devices, and networks shown in FIG. 2A are provided as an example. In practice, there may be additional controllers, modules, devices, and/or networks, fewer controllers, modules, devices, and/or networks, different controllers, modules, devices, and/or networks, or differently arranged controllers, modules, devices, and/or networks than those shown in FIG. 2A. For example, the network system 200 can include more or fewer blockchain controllers, AuthControl modules, secinfo modules, MEC Hub devices, MEC devices, BC agents, access points, cells, UAVs, user equipment, etc. Furthermore, two or more controllers, modules, or devices shown in FIG. 2A may be implemented within a single controller, module, or device, or a single controller, module, or device shown in FIG. 2A may be implemented as multiple, distributed controllers, modules, or devices (e.g., in a distributed and/or virtual environment). Additionally, or alternatively, a set of controllers, modules, or devices (e.g., one or more controllers, modules, or devices) of the network system 200 may perform one or more functions described as being performed by another set of controllers, modules, or devices of the network system 200. For example, although the blockchain controller 205 has been described herein as being separately implemented from the various MEC devices, such as the MEC Hub device 210 and the MEC devices 220, 230, and 240, in some embodiments, a portion or all of the functionality of the blockchain controller 205 can be implemented in one or more of the MEC Hub device 210 and the MEC devices 220, 230, and 240.

Figure 2B:
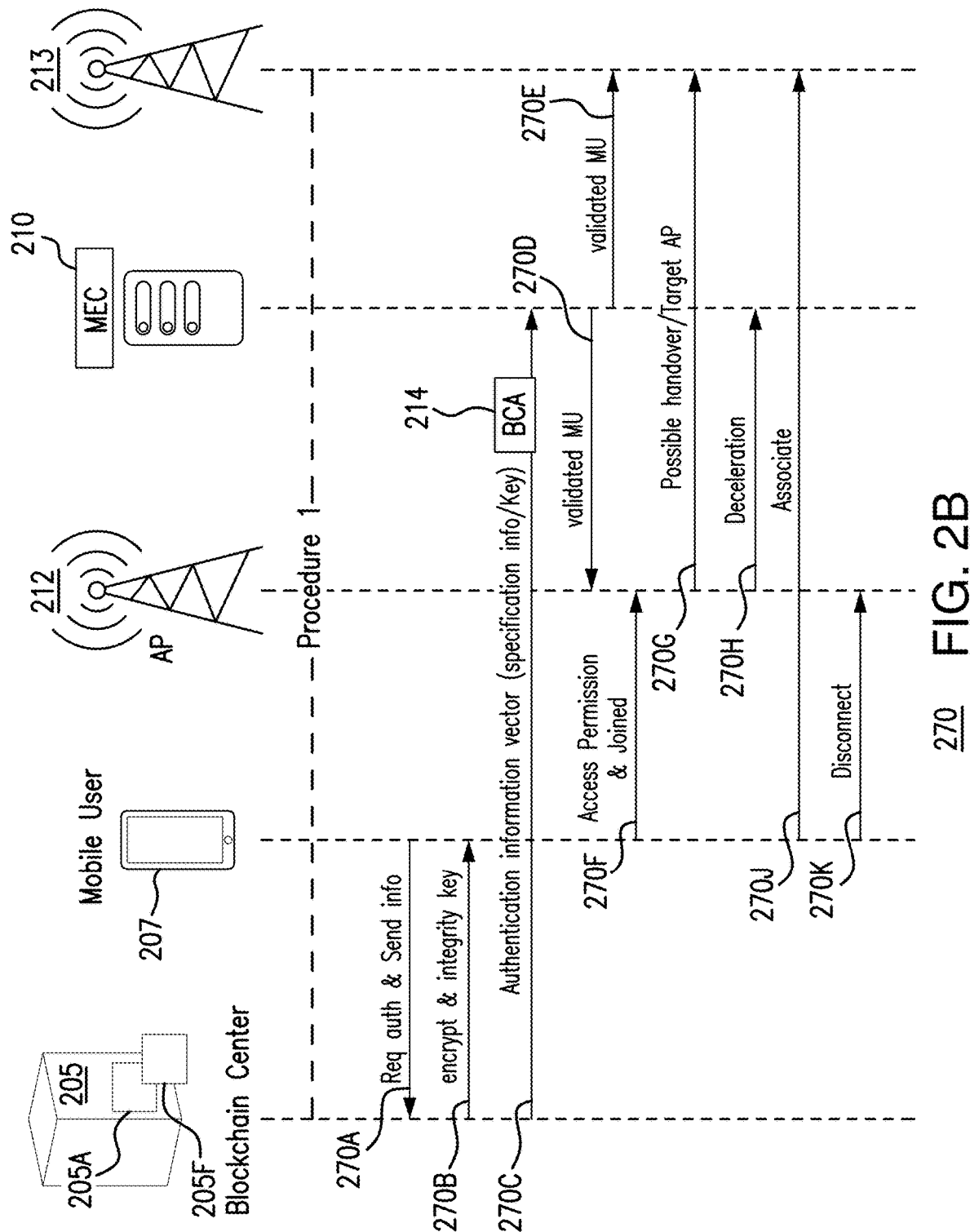
FIG. 2B depicts an illustrative embodiment of a data flow in accordance with various aspects described herein.

FIG. 2B depicts an illustrative embodiment of a data flow 270 in accordance with various aspects described herein. Data flow 270 illustrates registration or authentication of the user equipment 207 by the blockchain controller 205, and facilitation, by the MEC Hub device 210, of a handover for the user equipment 207 between the access points 212 and 213, without a need for the access point 213 to effect a handover authentication procedure.

At 270A, the blockchain controller 205 can receive data relating to the user equipment 207. For example, the blockchain controller 205 can receive data relating to the user equipment 207 in a manner similar to that described above with respect to the network system 200 of FIG. 2A. As an example, the data can serve as a request to register or authenticate the user equipment 207, and can include information regarding an identity of the user equipment 207, a current location of the user equipment 207, current signal strength(s) of nearby access points detected by the user equipment 207, a direction of movement of the user equipment 207, a speed of travel of the user equipment 207, physical layer properties of the user equipment 207, signal RTT, etc. In some embodiments, the AuthControl module 205A of the blockchain controller 205 can receive the data relating to the user equipment 207.

At 270B, the blockchain controller 205 can provide encryption data to the user equipment 207. For example, the blockchain controller 205 can provide encryption data in a manner similar to that described above with respect to the network system 200 of FIG. 2A. As an example, the encryption data can include one or more public and private key pairs.

At 270C, the blockchain controller 205 can transmit an authentication information vector to the MEC Hub device 210. For example, the blockchain controller 205 can transmit an authentication information vector to the MEC Hub device 210 in a manner similar to that described above with respect to the network system 200 of FIG. 2A. As an example, the authentication information vector can correspond to the encryption data (e.g., can include some or all of the public and/or private keys included in the encryption data). In some embodiments, the secinfo module 205F can generate the authentication information vector by encrypting one or more data packages (e.g., one or more capsuled data packages) including some or all of the public and/or private keys.

At 270D and 270E, the MEC Hub device 210 can provide a validation message to each of the access points 212 and 213. For example, the MEC Hub device 210 can provide validation messages to access points 212 and 213 in a manner similar to that described above with respect to the network system 200 of FIG. 2A. As an example, each validation message can correspond to the encryption data provided by the blockchain controller 205 to the user equipment 207.

At 270F, the user equipment 207 can establish a connection with the access point 212. At 270G, the user equipment 207, the access point 212, and/or the access point 213 can determine that a handover of the user equipment 207 to the access point 213 is needed, and perform the handover for the user equipment 207 (e.g., in a manner similar to that described above with respect to FIG. 2A). In some embodiments, the access point 212 and/or the access point 213 can determine that the handover is needed based on data relating to the user equipment 207, such as information regarding movement of the user equipment 207 toward the access point 213. In various embodiments, the access point 212 and/or the access point 213 can utilize the validation message (e.g., contents therein, such as public keys, identification information, etc.) to identify the user equipment 207 prior to effecting the handover. This provides for a secure, efficient, and seamless handover that eliminates a need for any of the access points 212 and 213 to perform additional actions, such as accessing other network resources to reauthenticate the user equipment 207.

At 270H, the access point 213 can provide a notification to the MEC Hub device 210 regarding an upcoming handover. In some embodiments, the MEC Hub device 210 can update one or more entries (associated with the user equipment 207) in a data structure based on the notification. At 270J, the user equipment 207 can establish a connection with the access point 213. For example, the access point 213 can, based on identifying the user equipment 207 using the validation message, permit establishment of the connection with the user equipment 207. At 270K, the user equipment 207 can disconnect from the access point 212.

Figure 2C:
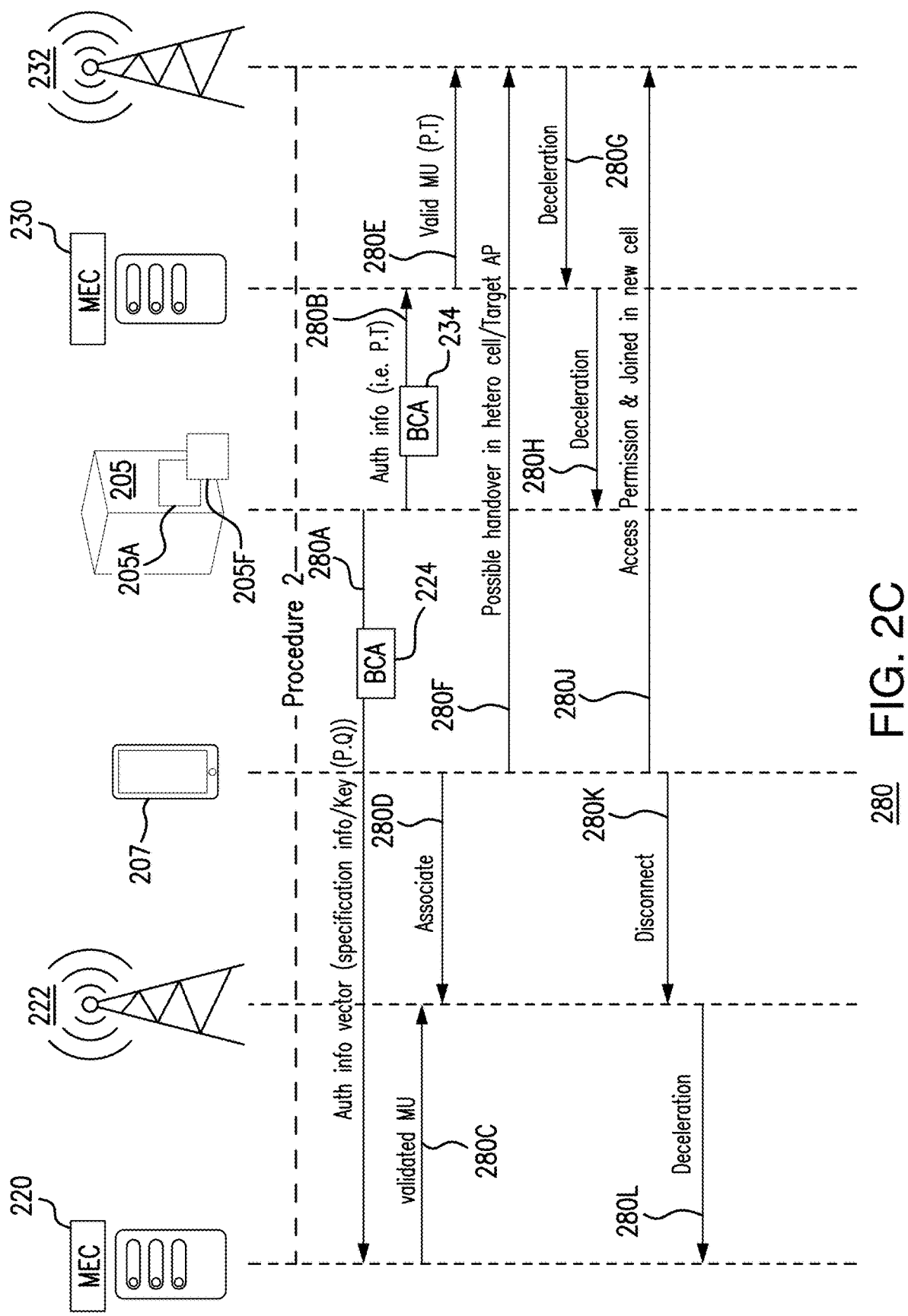
FIG. 2C depicts an illustrative embodiment of a data flow in accordance with various aspects described herein.

FIG. 2C depicts an illustrative embodiment of a data flow 280 in accordance with various aspects described herein. Data flow 280 illustrates a handover procedure, involving the user equipment 207, among two heterogeneous cells (e.g., in a 4G network, a 5G network, a higher generation network, or the like). Data flow 280 can begin after the blockchain controller 205 has registered or authenticated the user equipment 207.

At 280A, the blockchain controller 205 can transmit (e.g., via the BC agent 224) an authentication information vector to the MEC device 220. At 280B, the blockchain controller 205 can similarly transmit (e.g., via the BC agent 234) an authentication information vector to the MEC device 230. For example, the blockchain controller 205 can transmit the authentication information vectors to the MEC devices 220 and 230 in a manner similar to that described above with respect to the network system 200 of FIG. 2A. As an example, each authentication information vector can include one or more public keys assigned to the user equipment 207 (and included in encryption data provided by the blockchain controller 205 to the user equipment 207).

At 280C, the MEC device 220 can provide a validation message to the access point 222 and, at 280D, the user equipment 207 can establish a connection with the access point 222. At 280E, the MEC device 230 can similarly provide a validation message to the access point 232. For example, the MEC devices 220 and 230 can provide the validation messages to the access points 222 and 232 in a manner similar to that described above with respect to the network system 200 of FIG. 2A. As an example, each validation message can correspond to the encryption data provided by the blockchain controller 205 to the user equipment 207.

At 280F, the user equipment 207, the access point 222, and/or the access point 232 can determine that a handover of the user equipment 207 to the access point 232 is needed. At 280G, the access point 232 can provide a notification to the MEC device 230 regarding an upcoming handover, and at 280H, the MEC device 230 can provide a notification to the blockchain controller 205 regarding the upcoming handover. In various embodiments, the MEC device 230 can, based on the notification provided by the access point 232, update one or more entries (associated with the user equipment 207) in a data structure, e.g., for purposes of user equipment monitoring and management, such as for facilitating potential future handovers. In some embodiments, the blockchain controller 205 can, based on the notification provided by the MEC device 230, confirm whether the user equipment 207 has already been registered or authenticated, e.g., similar to that described above with respect to the network system 200 of FIG. 2A.

At 280J, the user equipment 207 can establish a connection with the access point 232 and, at 280K, the user equipment 207 can disconnect from the access point 222. At 280L, the access point 222 can provide a notification to the MEC device 220 regarding the handover and/or the disconnection from the user equipment 207. The MEC device 220 can, based on the notification provided by the access point 222, update one or more entries (associated with the user equipment 207) in a data structure, e.g., for purposes of user equipment monitoring and management, such as for handling potential future handovers.

Figure 2D:
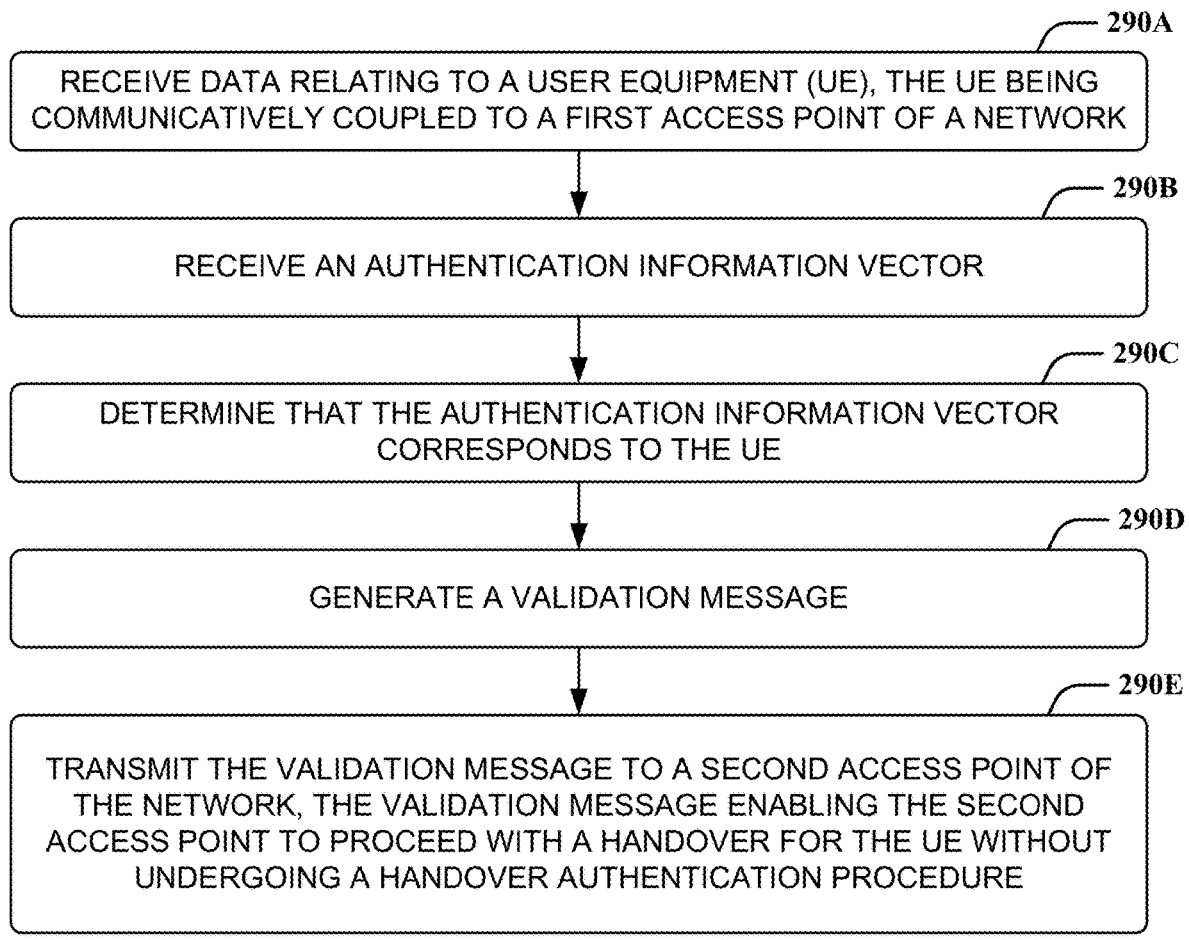
FIG. 2D depicts an illustrative embodiment of a method in accordance with various aspects described herein.

FIG. 2D depicts an illustrative embodiment of a method 290 in accordance with various aspects described herein. In some embodiments, one or more process blocks of FIG. 2D can be performed by a MEC device, such as the MEC Hub device 210 or one of the MEC devices 220, 230, and 240. In some embodiments, one or more process blocks of FIG. 2D may be performed by another device or a group of devices separate from or including the MEC device, such as the blockchain controller 205, the user equipment 207, the user equipment 208, the access point(s) 212, 213, 222, 232, and/or 242, the BC agent(s) 214, 224, 234, and/or 244, and/or the core network 245.

At 290A, the method can include receiving data relating to a user equipment, where the user equipment is communicatively coupled to a first access point of a network. For example, the MEC Hub device 210 can receive data relating to the user equipment 207 in a manner similar to that described above with respect to the network system 200 of FIG. 2A, where the user equipment 207 can be communicatively coupled to the access point 212.

At 290B, the method can include receiving an authentication information vector. For example, the MEC Hub device 210 can receive an authentication information vector from the blockchain controller 205 in a manner similar to that described above with respect to the network system 200 of FIG. 2A.

At 290C, the method can include determining that the authentication information vector corresponds to the user equipment. For example, the MEC Hub device 210 can determine that the authentication information vector corresponds to the user equipment 207 in a manner similar to that described above with respect to the network system 200 of FIG. 2A.

At 290D, the method can include generating a validation message. For example, the MEC Hub device 210 can generate a validation message in a manner similar to that described above with respect to the network system 200 of FIG. 2A.

At 290E, the method can include transmitting the validation message to a second access point, where the validation message enables the second access point to proceed with a handover for the user equipment without undergoing a handover authentication procedure. For example, the MEC Hub device 210 can transmit the validation message to the access point 213 in a manner similar to that described above with respect to the network system 200 of FIG. 2A and/or data flow 270 of FIG. 2B, where the validation message enables the access point 213 to proceed with a handover for the user equipment 207 without undergoing a handover authentication procedure.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2E:
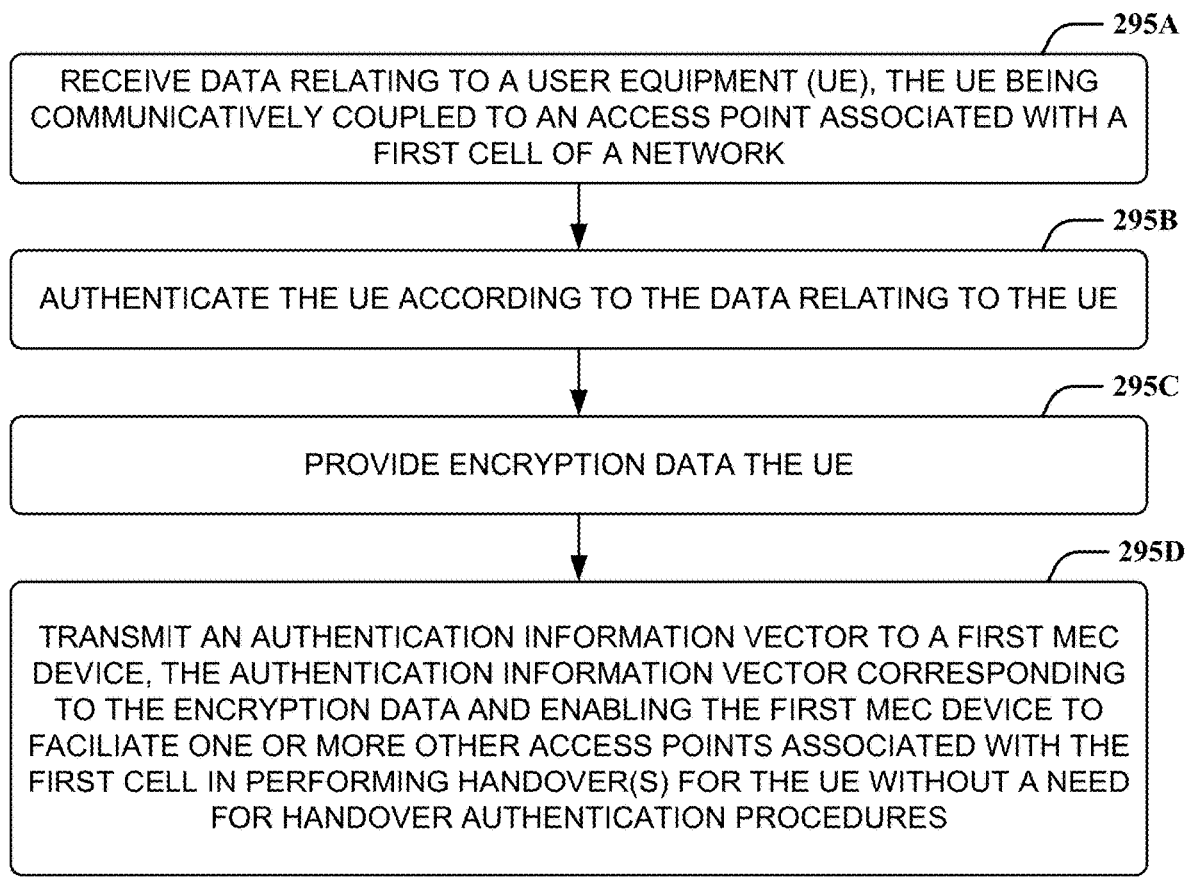
FIG. 2E depicts an illustrative embodiment of a method in accordance with various aspects described herein.

FIG. 2E depicts an illustrative embodiment of a method 295 in accordance with various aspects described herein. In some embodiments, one or more process blocks of FIG. 2E can be performed by a blockchain controller, such as the blockchain controller 205. In some embodiments, one or more process blocks of FIG. 2E may be performed by another device or a group of devices separate from or including the blockchain controller, such as the MEC Hub device 210, the MEC device(s) 220, 230, and/or 240, the user equipment 207, the user equipment 208, the access point(s) 212, 213, 222, 232, and/or 242, the BC agent(s) 214, 224, 234, and/or 244, and/or the core network 245.

At 295A, the method can include receiving data relating to a user equipment, where the user equipment is communicatively coupled to an access point associated with a first cell of a network. For example, the blockchain controller 205 can receive data relating to the user equipment 207 in a manner similar to that described above with respect to the network system 200 of FIG. 2A, where the user equipment 207 can be communicatively coupled to the access point 212 in the cell A1.

At 295B, the method can include authenticating the user equipment according to the data relating to the user equipment. For example, the blockchain controller 205 can authenticate the user equipment 207 according to the data relating to the user equipment 207 in a manner similar to that described above with respect to the network system 200 of FIG. 2A.

At 295C, the method can include providing encryption data to the user equipment. For example, the blockchain controller 205 can provide encryption data to the user equipment 207 in a manner similar to that described above with respect to the network system 200 of FIG. 2A.

At 295D, the method can include transmitting an authentication information vector to a first MEC device, where the authentication information vector corresponds to the encryption data and enables the first MEC device to facilitate one or more other access points associated with the first cell in performing handover(s) for the user equipment without a need for handover authentication procedures. For example, the blockchain controller 205 can transmit an authentication information vector to the MEC Hub device 210 in a manner similar to that described above with respect to the network system 200 of FIG. 2A, where the authentication information vector corresponds to the encryption data and enables the MEC Hub device 210 to facilitate the access points 212 and/or 213 in performing handovers for the user equipment 207 without a need for handover authentication procedures.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
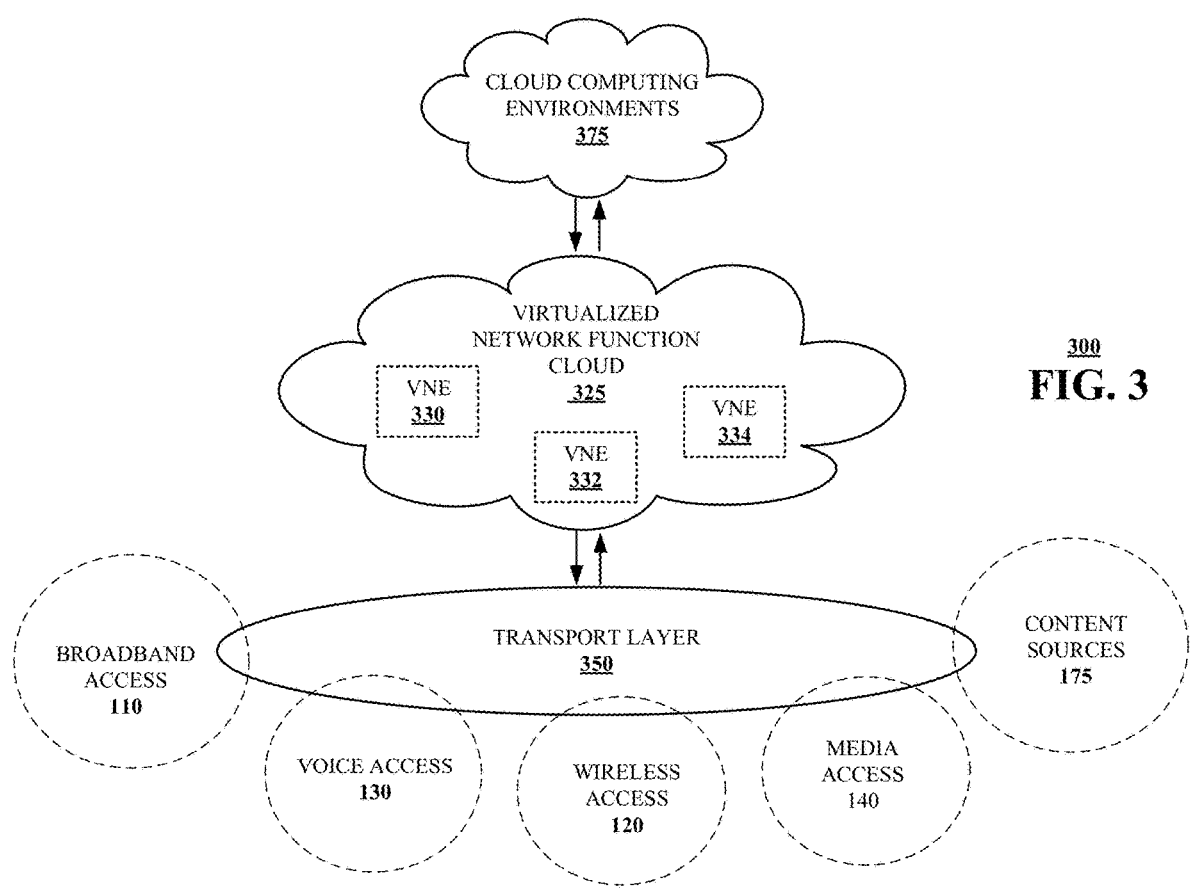
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of network system 200, data flows 270 and 280, and methods 290 and 295 presented in FIGS. 1, 2A, 2B, 2C, 2D, and 2E. For example, virtualized communication network 300 can facilitate in whole or in part secure and efficient federated blockchain-enabled handover authentication for user equipment in a heterogeneous network.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
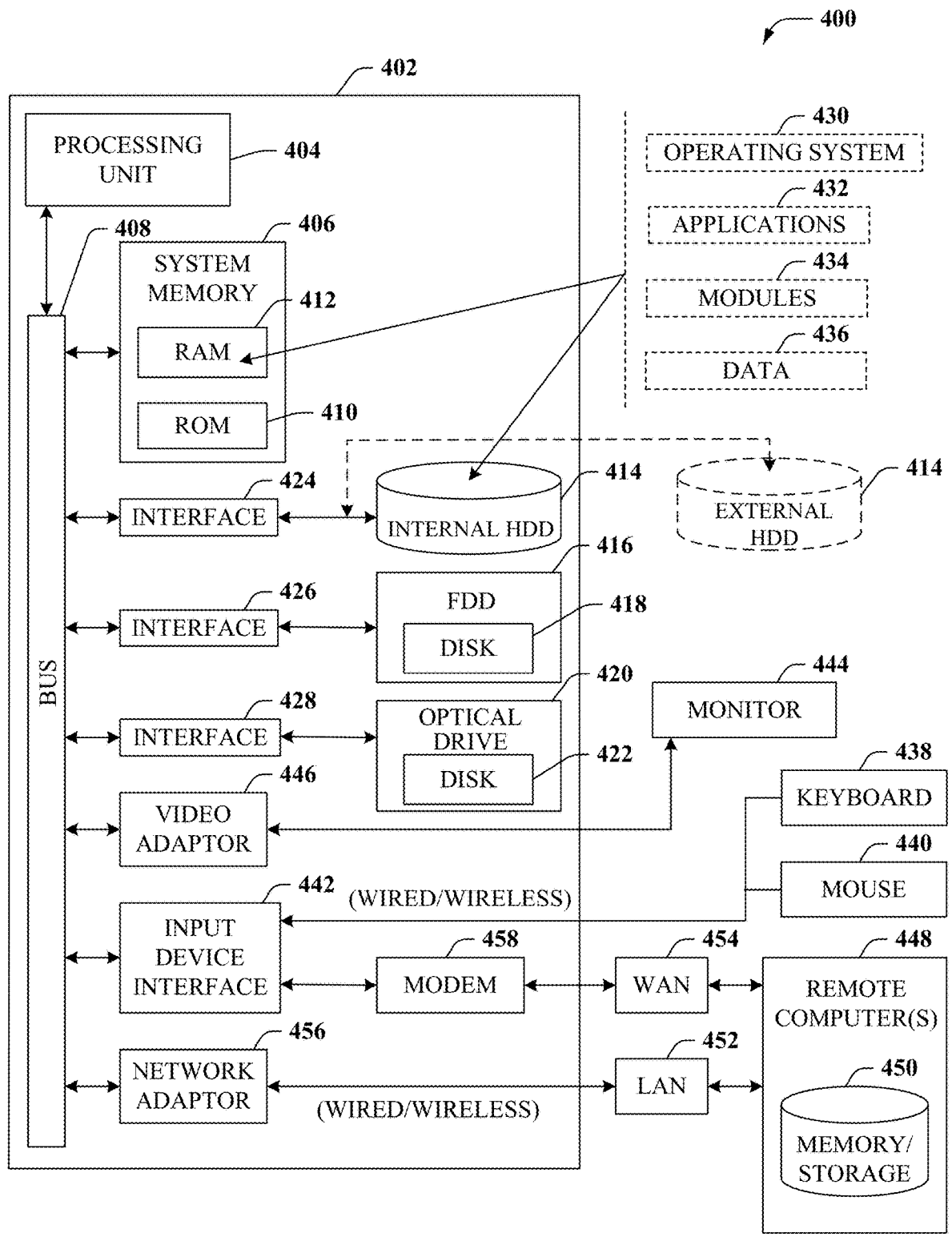
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part secure and efficient federated blockchain-enabled handover authentication for user equipment in a heterogeneous network.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
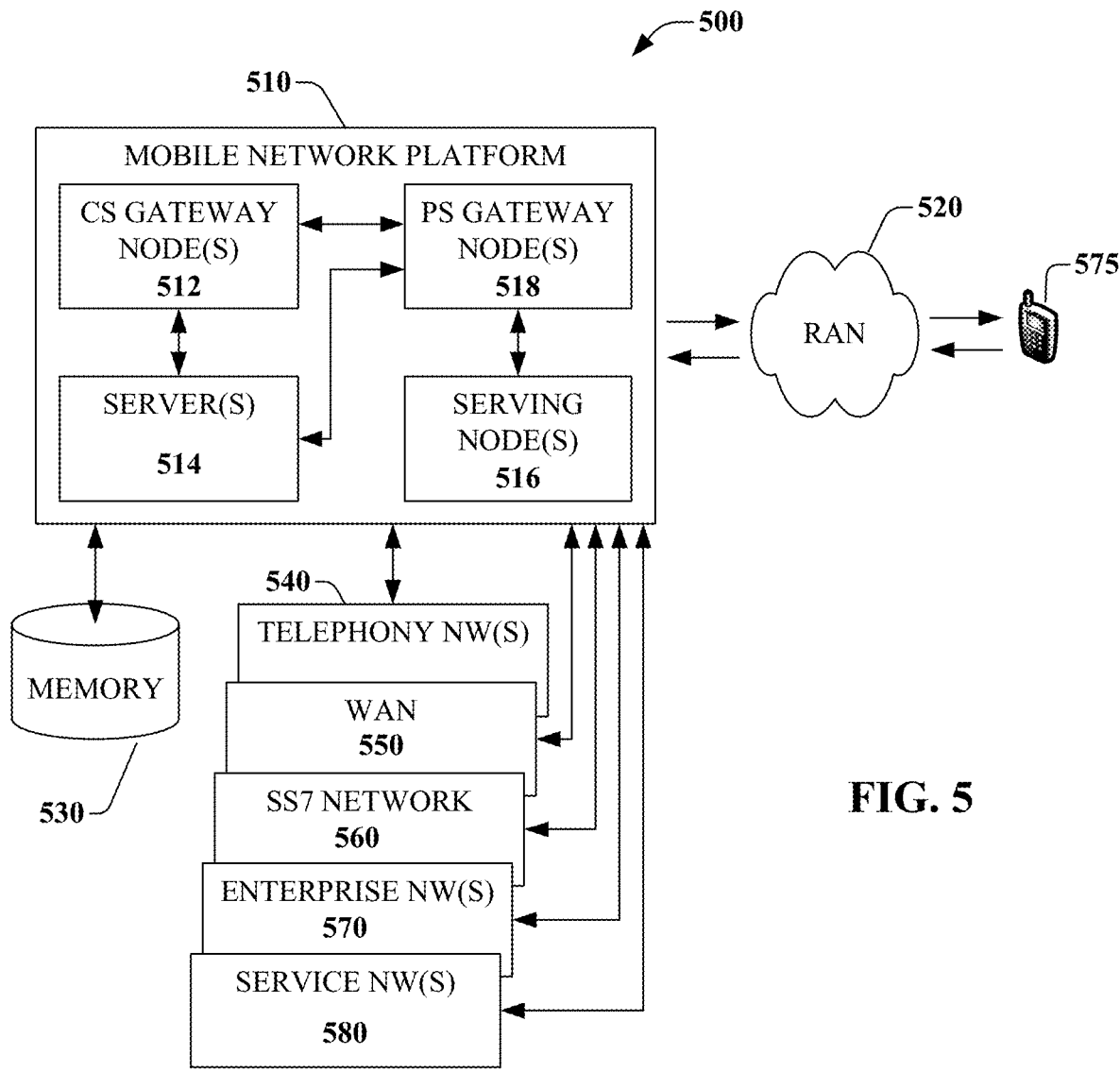
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part secure and efficient federated blockchain-enabled handover authentication for user equipment in a heterogeneous network.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1 that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
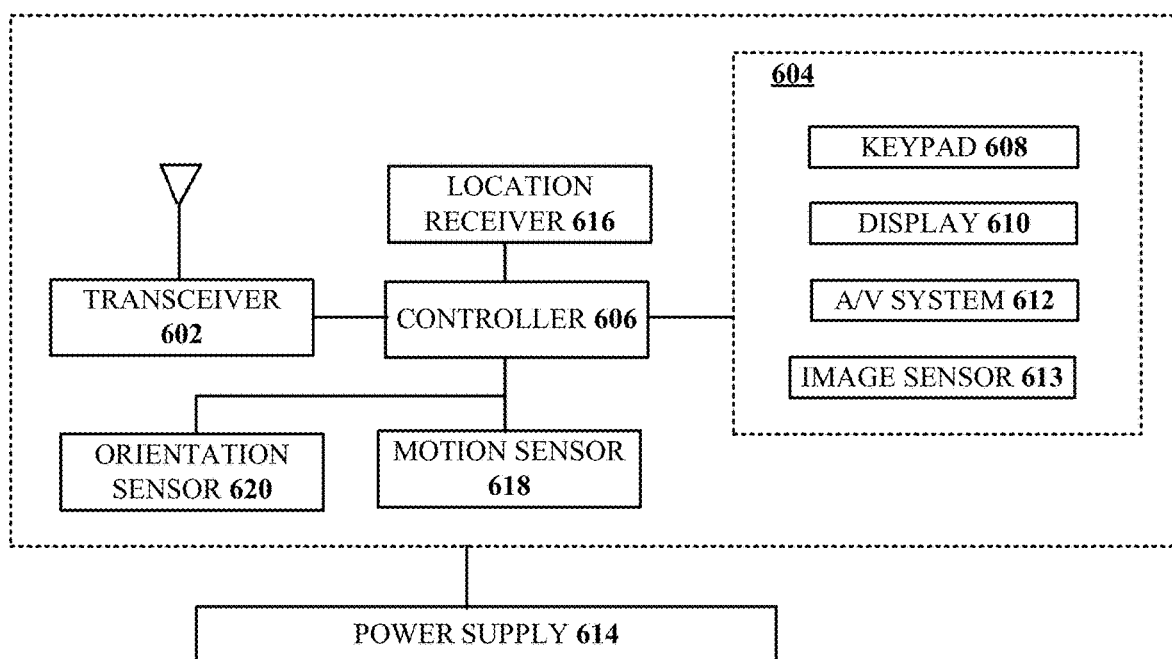
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part secure and efficient federated blockchain-enabled handover authentication for user equipment in a heterogeneous network.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
obtaining data relating to a user equipment, wherein the user equipment is communicatively coupled to a first access point of a plurality of access points, and wherein the plurality of access points is associated with a first cell of a plurality of heterogeneous cells of a network;
receiving, from a blockchain controller, an authentication information vector, wherein the authentication information vector is associated with a block of data of a blockchain stored in the blockchain controller;
determining that the authentication information vector corresponds to the user equipment based on the data relating to the user equipment;
generating a validation message responsive to the determining that the authentication information vector corresponds to the user equipment; and
transmitting the validation message to a second access point of the plurality of access points, wherein the second access point is configured to perform user equipment handover processing using a handover authentication procedure that maintains user equipment access to the network, and wherein the validation message causes the second access point to proceed with a handover for the user equipment without undergoing the handover authentication procedure.

2. The device of claim 1, wherein the device is located proximate to an edge of the network and provides edge computing capabilities for the network.

3. The device of claim 1, wherein the handover authentication procedure involves submitting verification requests to an external server device of the network that performs user equipment verifications, receiving validation data from the external service device as responses to the verification requests, and processing the validation data, and wherein the validation message causes the second access point to perform the handover for the user equipment by not utilizing particular validation data that is received from the external server device for the user equipment.

4. The device of claim 1, wherein the obtaining the data relating to the user equipment comprises obtaining the data relating to the user equipment from the first access point.

5. The device of claim 1, wherein the data relating to the user equipment includes information regarding an identity of the user equipment.

6. The device of claim 1, wherein the data relating to the user equipment includes real-time measurement data.

7. The device of claim 1, wherein a second cell of the plurality of heterogeneous cells is associated with at least one access point, and wherein the operations further comprise causing the validation message to be provided to the at least one access point.

8. The device of claim 7, wherein the operations further comprise determining that the user equipment is moving toward the second cell, wherein the causing the validation message to be provided to the at least one access point is in accordance with the determining that the user equipment is moving toward the second cell, and wherein the validation message enables the at least one access point to proceed with one or more handovers for the user equipment without undergoing any handover authentication procedures.

9. The device of claim 7, wherein the second cell of the plurality of heterogeneous cells is associated with a multi-access edge computing (MEC) device, and wherein the causing the validation message to be provided to the at least one access point comprises transmitting the validation message to the MEC device.

10. A non-transitory machine-readable storage device, comprising executable instructions that, when executed by a processing system including a processor, facilitate performance of operations comprising:
providing, to a blockchain controller, data relating to a user equipment to authenticate the user equipment, wherein the user equipment is communicatively coupled to a network via a first access point, and wherein the first access point is associated with a first cell of a plurality of heterogeneous cells of the network;
obtaining, from the blockchain controller, encryption data, wherein the encryption data is associated with a block of data of a blockchain accessible to the blockchain controller, wherein the encryption data facilitates creation of an authentication information vector to be provided to a multi-access edge computing (MEC) device that corresponds to a second access point associated with a second cell of the plurality of heterogeneous cells of the network, and wherein the authentication information vector enables the MEC device to provide, to the second access point, a validation message relating to the user equipment; and
communicating with the second access point to effect a handover for the user equipment from the first cell to the second cell, wherein the second access point is configured to perform user equipment handover processing using a handover authentication procedure that maintains user equipment access to the network, and wherein the validation message causes the second access point to proceed with the handover for the user equipment without undergoing the handover authentication procedure.

11. The non-transitory machine-readable storage device of claim 10, wherein the processing system is located in the user equipment, wherein the handover authentication procedure involves submitting verification requests to an external server device of the network that performs user equipment verifications, receiving validation data from the external service device as responses to the verification requests, and processing the validation data, and wherein the validation message causes the second access point to perform the handover for the user equipment by not utilizing particular validation data that is received from the external server device for the user equipment.

12. The non-transitory machine-readable storage device of claim 10, wherein the data relating to the user equipment includes information regarding an identity of the user equipment.

13. The non-transitory machine-readable storage device of claim 10, wherein the data relating to the user equipment includes information regarding a speed of travel of the user equipment, a direction of travel of the user equipment, a location of the user equipment, or any combination thereof.

14. The non-transitory machine-readable storage device of claim 10, wherein the first access point employs a first radio access technology, and wherein the second access point employs a second radio access technology that is different than the first radio access technology.

15. The non-transitory machine-readable storage device of claim 10, wherein the blockchain controller comprises a federated blockchain network, and wherein the federated blockchain network includes a plurality of resources spanning private cloud service provider (CSP) nodes and/or public blockchain nodes.

16. A method, comprising:
obtaining, by a processing system including a processor, data relating to a user equipment, wherein the data includes information identifying the user equipment, and wherein the user equipment is communicatively coupled to a first access point associated with a first cell of a plurality of heterogeneous cells of a network;
authenticating, by the processing system, the user equipment according to the data relating to the user equipment, wherein the authenticating the user equipment includes verifying the information identifying the user equipment and updating a blockchain with a block of data according to the verifying the information identifying the user equipment;
providing, by the processing system, encryption data to the user equipment responsive to the authenticating the user equipment; and
transmitting, by the processing system, an authentication information vector to a first multi-access edge computing (MEC) device, wherein the authentication information vector corresponds to the encryption data and enables the first MEC device to cause a second access point associated with the first cell to perform handovers for the user equipment without a need for the second access point to undergo a handover authentication procedure.

17. The method of claim 16, wherein the processing system includes a federated blockchain network, and wherein the federated blockchain network includes a plurality of resources spanning private cloud service provider (CSP) nodes and/or public blockchain nodes.

18. The method of claim 16, further comprising:
transmitting, by the processing system, the authentication information vector to a second MEC device, wherein the second MEC device is communicatively coupled to at least one access point associated with a second cell of the plurality of heterogeneous cells of the network, and wherein the authentication information vector enables the second MEC device to direct the at least one access point to effect handovers involving the user equipment without undergoing any handover authentication procedures.

19. The method of claim 16, further comprising:
generating, by the processing system, the authentication information vector responsive to the authenticating the user equipment.

20. The method of claim 16, wherein the verifying the information identifying the user equipment comprises accessing one or more server devices of the network.

* * * * *